United States Patent [19]

Jones et al.

[11] Patent Number: 4,726,631
[45] Date of Patent: Feb. 23, 1988

[54] TRACK COMPENSATOR

[75] Inventors: Raymond E. Jones, Lexington; James J. Connerley, Georgetown; Bruce M. Kliment, Lexington, all of Ky.

[73] Assignee: FMC Corporation, Chicago, Ill.

[21] Appl. No.: 848,529

[22] Filed: Apr. 7, 1986

[51] Int. Cl.⁴ .............................................. B62D 55/30
[52] U.S. Cl. ........................................ 305/31; 305/10; 267/120; 267/292
[58] Field of Search ........................ 305/10, 29, 31, 32; 267/63 R, 71, 153, 120

[56] References Cited

U.S. PATENT DOCUMENTS

| | | | |
|---|---|---|---|
| 2,263,599 | 11/1941 | Tucker | 267/63 R X |
| 2,649,213 | 8/1953 | Withall | 267/63 R X |
| 3,008,772 | 11/1961 | Helsel, Sr. | 305/10 |
| 3,645,586 | 2/1972 | Piepho | 305/10 |
| 3,692,368 | 9/1972 | Alexander | 305/10 |
| 3,980,351 | 9/1976 | Orr et al. | 305/10 |
| 4,323,283 | 4/1982 | Muramoto et al. | 305/10 |
| 4,361,363 | 11/1982 | Livesay | 305/31 X |

Primary Examiner—Robert B. Reeves
Assistant Examiner—Russell D. Stormer
Attorney, Agent, or Firm—Raymond E. Parks; Lloyd B. Guernsey; Richard B. Megley

[57] ABSTRACT

A track compensator for adjusting tension of an endless track on a track-laying vehicle and for absorbing changes in track tension during vehicle operation. A tension adjuster, connected to an idler wheel, adjusts the distance between a drive wheel, at one end of the track, and the idler wheel at the other end of the track. A shock absorber mounted between the vehicle and the tension adjuster absorbs stress on the track caused by debris between the track and vehicle wheels.

1 Claim, 5 Drawing Figures

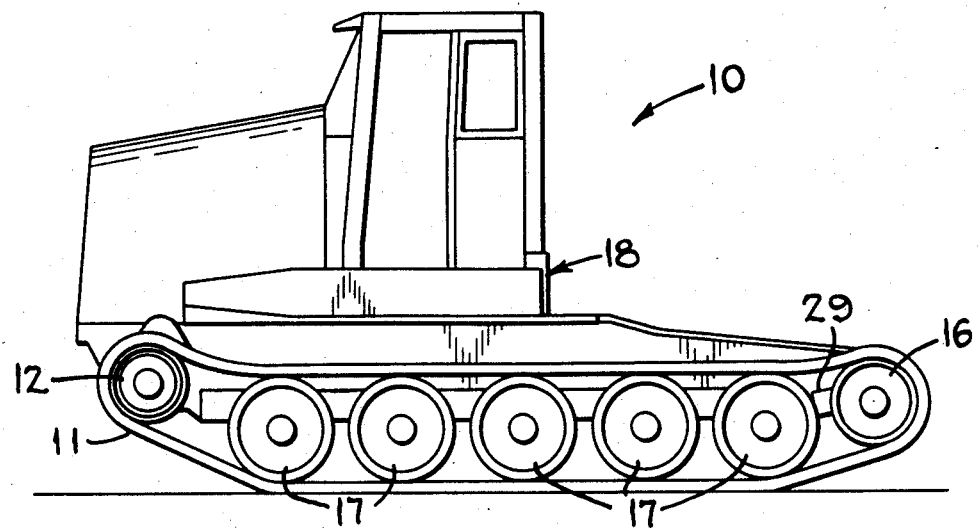
FIG_1
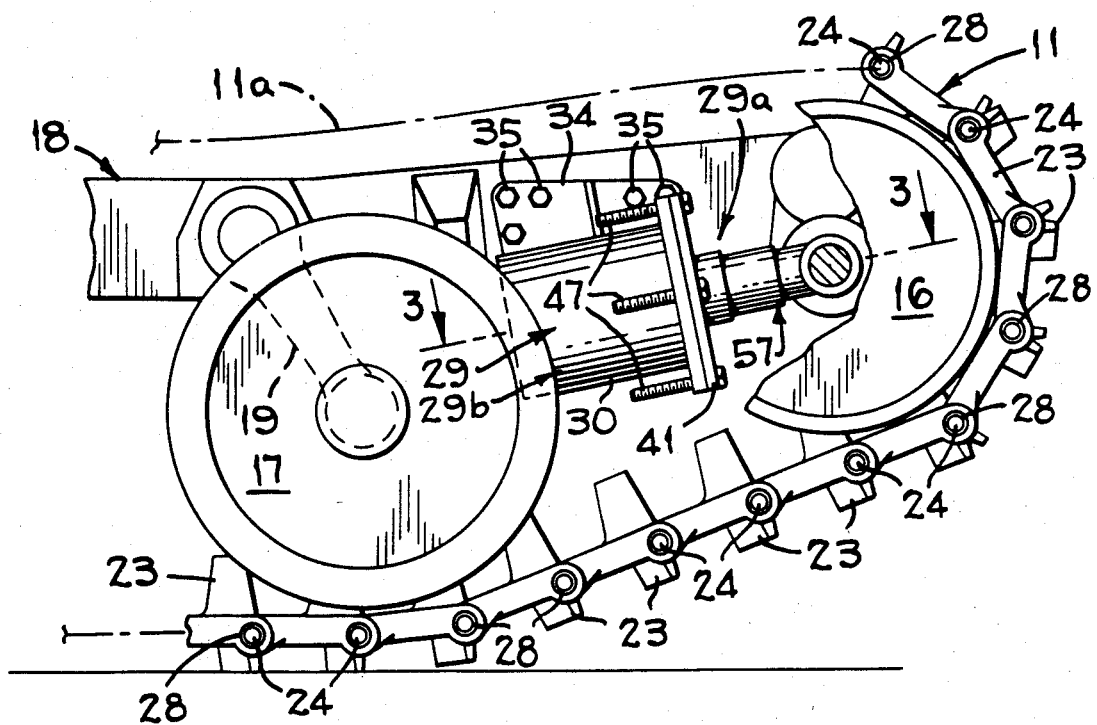
FIG_2

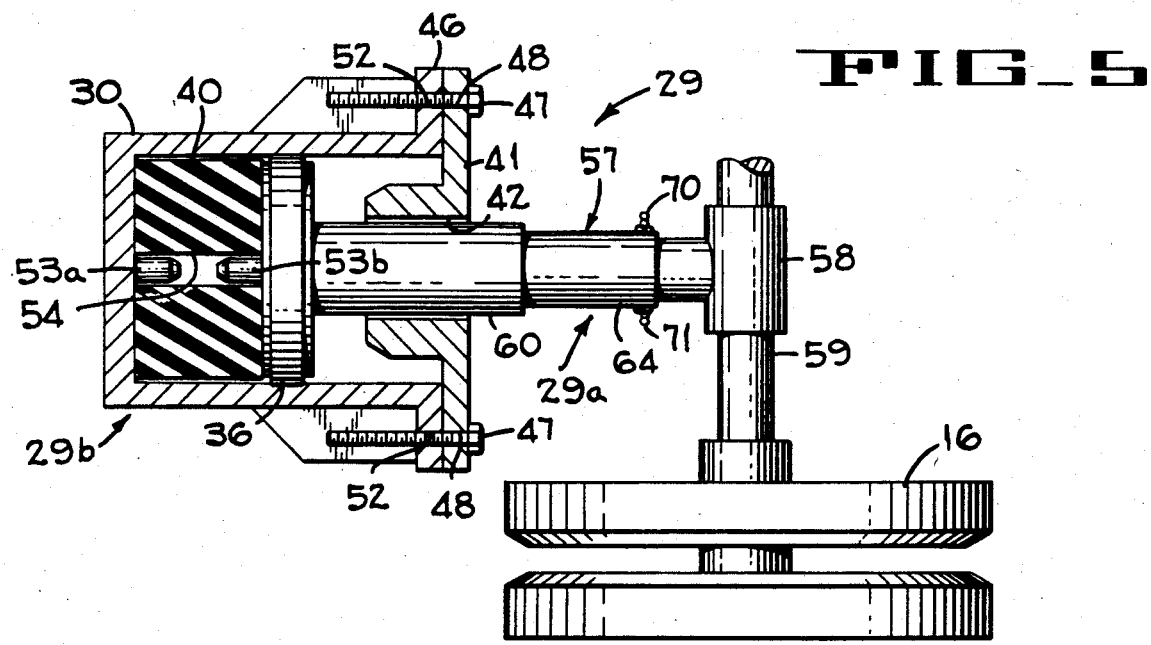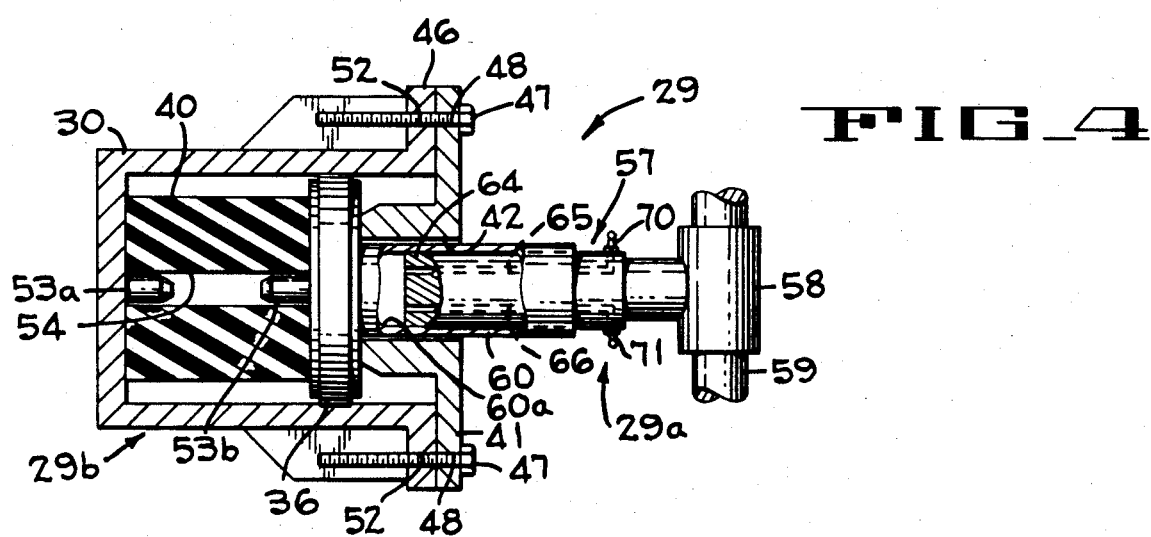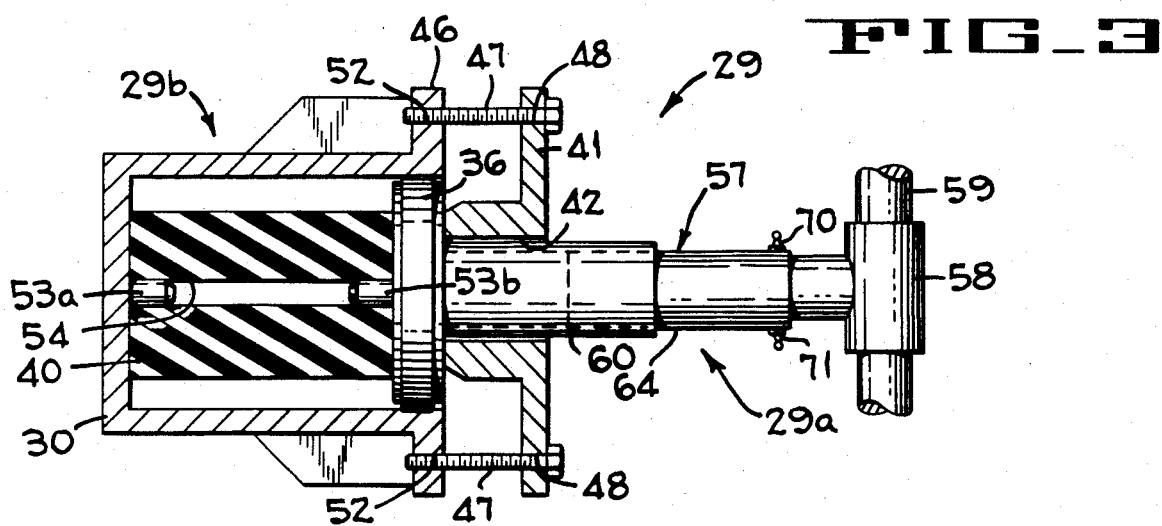

TRACK COMPENSATOR

BACKGROUND OF THE INVENTION

The present invention pertains to track-laying crawler vehicles, and more particularly, to means for compensating for a change in tension on the vehicle track caused by debris on an inner portion of the track.

Track-laying crawler vehicles, such as crawler cranes each use a pair of endless tracks which provide a large area of support contact with the terrain so the vehicles can be used on relatively soft ground. The tracks comprise a series of segments or shoes pivotally interconnected by a plurality of pivot pins mounted in bushings in the shoes. Each of the tracks is trained around a drive sprocket wheel, an idler sprocket wheel and a plurality of road wheels with the drive sprocket wheel at one end of the vehicle and the idler sprocket wheel at the other end of the vehicle. Tension on the track is varied by adjusting the distance between the drive wheel and the idler wheel. When debris is picked up by the track and moved between the wheels and the inside of the track, tension on the track can increase causing increased stain and wear on pivot pins, bushings, wheel bearings and vehicle suspension.

SUMMARY OF THE INVENTION

The present invention reduces the strain on pivot pins, bushings, wheel bearings and vehicle suspension by using a tension adjusting means to adjust the distance between the idler wheel and the drive wheel, and using a shock absorber to absorb changes in track tension during operation of the vehicle. The idler wheel is rotatably connected to an adjustable grease cylinder and the shock absorber is connected between the adjustable grease cylinder and the track-laying vehicle. The grease cylinder is adjusted to provide the desired track tension and the shock absorber contracts when debris between the track and one of the wheels increased track tension. Contraction of the shock absorber minimizes the amount of increase in track tension by allowing the idler wheel to move slightly toward the drive wheel. When the debris no longer causes the increase in track tension the shock absorber expands to return the idler wheel to the original position relative to the drive wheel.

BRIEF DESCRIPTION OF THE DRAWINGS

FIG. 1 is a schematic side elevation of a tracked vehicle using the present invention.

FIG. 2 is an enlarged side elevation view of a track compensator, with portions broken away, according to the preferred embodiment of the invention.

FIG. 3 is a top view of FIG. 2 with a section taken along line 3—3 of FIG. 2.

FIG. 4 is a section like FIG. 3 with portions broken away.

FIG. 5 is a top view of FIG. 2 with a section taken along line 3—3 of FIG. 2 and with an idler wheel shown.

DESCRIPTION OF THE PREFERRED EMBODIMENT

One type of tracked vehicle 10 (FIG. 1) is provided at each side with an endless track 11 trained around a drive sprocket wheel 12, an idler wheel 16 and which has its lower side engaged by a plurality of road wheels 17 to support a body portion 18. The road wheels are each mounted on individual suspension arms 19 (FIG. 2) and the drive and idler sprocket wheels are each mounted on axles about which the sprocket wheels can rotate. In the usual manner, the tracks comprise a series of segments or track shoes 23 which are shown in the enlarged FIG. 2, and are adapted to follow the ground contour, being pivotally interconnected by pivot pins 24. The pins 24 are each mounted in a bushing 28 in adjoining shoes 23.

A track compensator 29 (FIGS. 2–5), includes a tension adjusting portion 29a for adjusting tension in the endless track 11 and a shock absorber portion 29b for absorbing changes in track tension during vehicle operation. Track compensator 29 includes a restraint tube 30 and attached mounting bracket 34 (FIG. 2) with the mounting bracket 34 being connected to the body portion 18 of vehicle 10 by a plurality of capscrews 35. A piston 36 and a rubber spring 40 (FIGS. 3–5) mounted in restraint tube 30 comprise the shock absorber portion 29b. A generally circular retainer 41 having a central bore 42 is secured to a radially enlarged portion 46 of the restraint tube 30 by a plurality of capscrews 47 extending through a plurality of holes 48 in retainer 41 into a plurality of threaded holes 52 in portion 46 of tube 30. The capscrews 47 are used to pull retainer 41 against piston 36 (FIGS. 3, 4) to produce an initial pre-compression in rubber spring 40. The pre-compression in spring 40 allowes an initial tension to be maintained on track 11 until further spring compression is required to compensate for debris or ice between drive wheel 12 and/or idler wheel 16 and track 11. A pair of centering pins 53a, 53b in a bore 54 in spring 40 center the spring inside restraint tube 30. One rubber spring 40 which can be used is the Marsh Mellow made by Firestone Rubber Company, Noblesville, Ind.

Tension adjusting portion 29a (FIGS. 3–5) of compensator 29 comprises an adjustable grease cylinder 57 having a first end attached to piston 36 and having a second end attached to a sleeve 58. An axle 59 (FIG. 5) is securely mounted in sleeve 58 and idler wheel 16 is rotatably mounted on axle 59. A tubular portion 60 of adjustable grease cylinder 57 extends through bore 42 in retainer 41 and one end of tubular portion 60 is welded or otherwise secured to piston 36. A piston 64 having a pair of passages 65, 66 (FIG. 4) extending generally lengthwise in piston 64 conduct pressurized grease from a pair of grease nipples 70, 71 to a chamber 60a between pistons 36 and 64. When pressurized grease is forced into chamber 60a the piston 64 moves from the retarded position shown in FIG. 3 toward the expanded position shown in FIG. 5.

The track compensator 29 (FIGS. 3–5) is assembled by inserting spring 40 and piston 36 into restraint tube 30 (FIG. 3). Retainer 41 and capscrews 47 are used to compress spring 40 to the pre-compressed position shown in FIG. 4 by threading capscrews 47 into threaded holes 52. After the spring 40 is pre-adjusted, grease is forced into chamber 60a forcing piston 64 (FIG. 3) and idler wheel 16 rearward (FIG. 1) until an upper portion 11a of track 11 clears the upper portion of one of the road wheels 17 by a predetermined amount. During road operation debris between drive sprocket wheel 12 and track 11 or between idler sprocket wheel 16 and track 11 can cause spring 40 to be compressed to the position shown in FIG. 5. This compressibility of spring 40 relieves stress on wheels 12 and 16, on track 11, sleeve 58 and other portions of vehicle 10. When debris is no longer between track 11 and one of the wheels, spring 40 expands to maintain proper track tension.

Thus, the present invention provides a track compensator having a portion for adjusting the tension of the endless track and a shock absorbing portion for absorbing stress on wheels and other parts of the vehicle caused by debris between the track and wheels on the vehicle.

Although the best mode contemplated for carrying out the present invention has been herein shown and described, it will be apparent that modification and variation may be made without departing from what is regarded to be the subject matter of the invention.

What is claimed is:

1. A track compensator for adjusting tension in an endless track on a crawler comprising:
   a restraint tube having a closed end and an open end and an internal diameter;
   a tension piston slideably mounted in said tube and engageable with said internal diameter, said piston having a piston side facing said closed end of said restraint tube;
   a first centering pin attached to said piston side of said piston and a second centering pin attached to said closed end of said restraint tube, said pins projecting toward each other and being substantially axially aligned;
   a cylindrical rubber spring having a central bore extending therethrough and an outer diameter, when relexed, substantially less than said internal diameter of said restraint tube, said central bore of said rubber spring axially positioned on said pins;
   adjustment end caps means for capping said open end of said restraint tube and for moving said piston toward said closed end for pre-compressing said rubber spring, the outer diameter of said rubber spring approaching said inner diameter of said restraint tube both in pre-compression and in shock absorbing compression;
   a grease cylinder having a closed end attached to said piston and extending through a bore in said end cap means;
   said bore in said end cap means of a diameter greater than the outer diameter of said grease cylinder; and
   a grease piston slideably mounted in said grease cylinder and having internal passages communicating with said closed end in said grease cylinder for introduction of grease between said closed end of said grease cylinder and said grease piston for adjusting the length of said grease piston and the tension in said endless track.

* * * * *